United States Patent [19]

Carpenter

[11] Patent Number: 4,815,764
[45] Date of Patent: Mar. 28, 1989

[54] CARRYING DEVICE FOR STROLLERS

[76] Inventor: Dianne M. Carpenter, 3943 Boxelder, Loveland, Colo. 80537

[21] Appl. No.: 160,634

[22] Filed: Feb. 26, 1988

[51] Int. Cl.⁴ .............................................. B60R 9/06
[52] U.S. Cl. ............................ 280/769; 224/42.46 R; 280/47.38; 280/647; 280/650; 280/658; 297/219; 383/24
[58] Field of Search .............. 280/769, 644, 643, 648, 280/650, 647, 658, 47.38, 47.19; 224/42.46 B, 42.46 R, 275; 297/191, 219; 383/24

[56] References Cited

U.S. PATENT DOCUMENTS

| | | | |
|---|---|---|---|
| 1,176,598 | 3/1916 | Pollgreen | 224/42.46 R |
| 2,205,302 | 6/1940 | Morgenstern | 297/219 |
| 2,703,426 | 6/1954 | Barkl | 15/257 |
| 2,724,429 | 11/1952 | Warner | 297/149 |
| 2,770,488 | 4/1954 | Kuniholm | 296/107 |
| 2,781,225 | 11/1953 | Heideman | 280/642 |
| 2,897,976 | 8/1959 | Miller | 211/113 |
| 2,953,288 | 9/1960 | Peterson | 297/191 |
| 3,014,759 | 12/1961 | Bing | 297/191 |
| 3,479,085 | 11/1969 | Weinstein | 297/191 |
| 4,131,313 | 12/1978 | Jacobs | 297/191 |
| 4,157,839 | 6/1979 | Lahti et al. | 280/643 |
| 4,273,380 | 6/1981 | Silvestri | 297/191 |
| 4,449,750 | 5/1984 | Pultman | 297/188 |
| 4,466,659 | 8/1984 | Carpentier et al. | 297/191 |
| 4,491,257 | 1/1985 | Ingles | 224/42.45 R |
| 4,577,903 | 3/1986 | Wells | 297/188 |
| 4,657,269 | 4/1987 | Elvin | 280/47.38 |

*Primary Examiner*—David M. Mitchell
*Assistant Examiner*—Eric Culbreth
*Attorney, Agent, or Firm*—Dean P. Edmundson

[57] ABSTRACT

A carrying device is described for attachment to a baby stroller of the type which is foldable and which includes upper and lower crossmembers exposed on the back of the stroller. The carrying device includes a flexible sheet material (such as fabric) and one or more pocket members. The first end of the device is attached to the upper cross member. The device extends around the lower crossmember and is attached at its second end to the back of the stroller between the upper and lower crossmembers. The pocket members are accessible from the back of the stroller. The carrying device does not have to be removed in order to recline or fold the stroller.

14 Claims, 5 Drawing Sheets

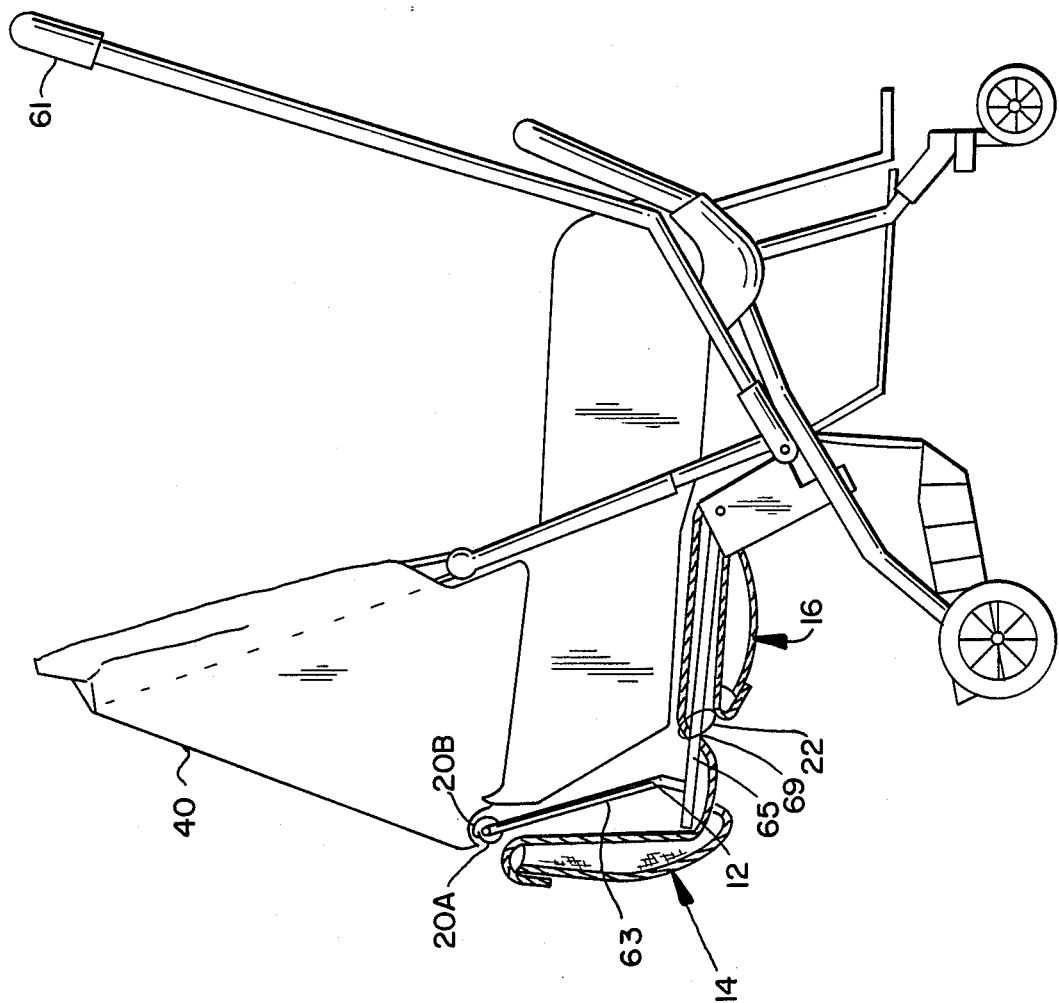

CARRYING DEVICE FOR STROLLERS

FIELD OF THE INVENTION

This invention relates to carrying and storage devices which can be attached to baby stroller. More particularly, this invention relates to carrying and storage devices which can be detachably mounted to the backmember of a baby stroller.

BACKGROUND OF THE INVENTION

Baby strollers have been in common use for a long time and are very convenient for their intended purposes. When using such a stroller it is usually necessary to also carry along or be in possession of various child care items such as diapers, bottles, tissues, toys, etc. As a practical matter all of such accessories cannot be placed in the stroller with the baby. Even if they could be placed next to the baby, the items must be removed when the stroller is folded for storage. Also, loose items laying in the stroller could be lost while using the stroller.

A person can carry one or more accessory bags which contain the desired accessories for the baby, but this can be rather awkward. It is not practical to try to attach a conventional accessory bag to a stroller.

Various types of strollers are described in U.S. Pat. Nos.: 2,781,225; 2,770,488; and 4,657,269. However, none of these patents describe a practical carrying device for a foldable stroller. U.S. Pat. No. 2,724,429 describes a high chair to which a shopping bag can be attached, but this is not practical for a stroller.

Storage bags for wheel chairs are described in U.S. Pat. Nos. 4,449,750 and 4,577,903. These structures would not be suitable for use on strollers. Also, the basket described in U.S. Pat. No. 4,491,257 for attachment to a wheelchair or walker would not be suitable for use on strollers.

Various other types of attachments or holders are described in the following U.S. Pat. Nos.: 2,703,426; 2,897,976; 3,014,759; 4,273,380; and 4,466,659. None of such attachments or holders, however, would be suitable for use on a stroller.

There has not heretofore been described a carrying device for foldable strollers which has the advantages provided by the present invention.

SUMMARY OF THE PRESENT INVENTION

In accordance with the present invention there is provided a carrying device which is adapted to be detachably mounted to a foldable stroller of the type having upper and lower crossmembers which are exposed or accessible on the back of the stroller. In a preferred embodiment the carrying device comprises:

(a) a length of flexible sheet material (e.g., fabric) having first and second ends;
(b) first and second pocket members each having closure means for selectively closing the pocket members; one pocket being secured to each end of the sheet material;
(c) first attachment means secured to the first end of the sheet material; and
(d) second attachment means secured to the second end of the sheet material.

The carrying device can be attached at its first end to the upper crossmember of the stroller. Then the device extends downwardly where it is passed around the lower crossmember, after which it extends upwardly. The second end of the device is secured to the backmember of the stroller. For example, it may be tied to the backmember with strings or cords carried by the second end of the device.

The pocket members are readily accessed from behind the stroller. The carrying device does not have to be removed or detached in order to permit the backmember to be reclined, nor does the carrying device have to be removed or detached in order to permit the stroller to be folded for storage.

The carrying device is preferably made of fabric, although it could also be made of other flexible materials such as plastic, if desired. No modification or alteration of the stroller is required in order for the carrying device to be attached. Also, it can be easily detached when desired.

The carrying device is able to keep contents in the pockets when the stroller is folded for storage. It also does not interfere with use of the basket under the stroller.

BRIEF DESCRIPTION OF THE DRAWINGS

The invention is described in more detail hereinafter with reference to the accompanying drawings, wherein like reference characters refer to the same parts throughout the several views and in which:

FIG. 4 is a side elevational view, partially cutaway, showing the stroller of FIG. 2 in a recline position;

DETAILED DESCRIPTION OF THE INVENTION

Figure 3:
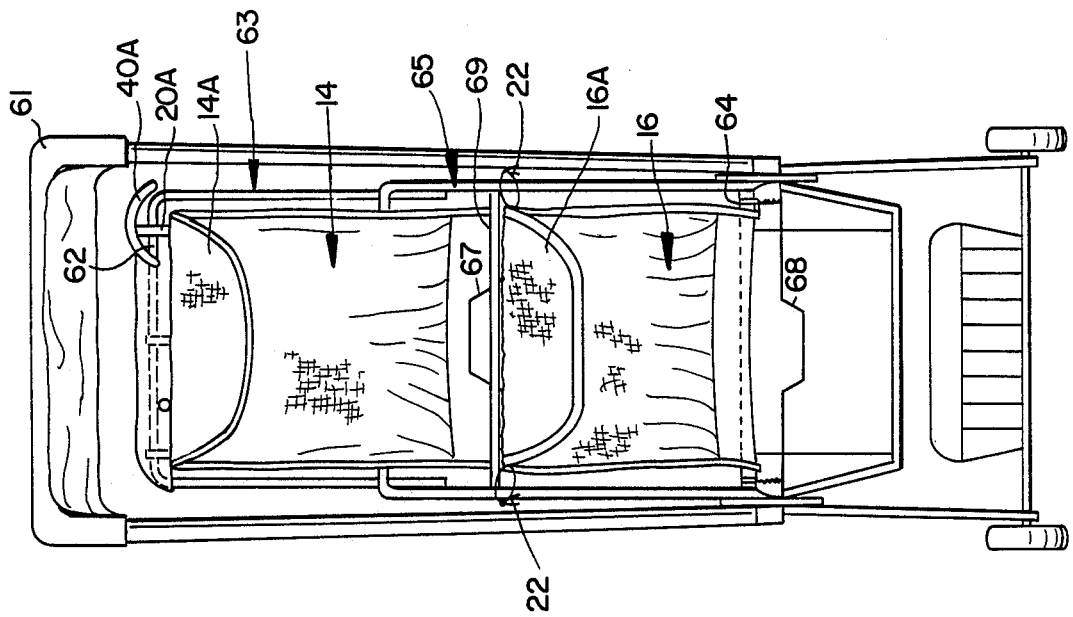
FIG. 3 is a rear elevational view of the embodiment shown in FIG. 2.
Figure 1:
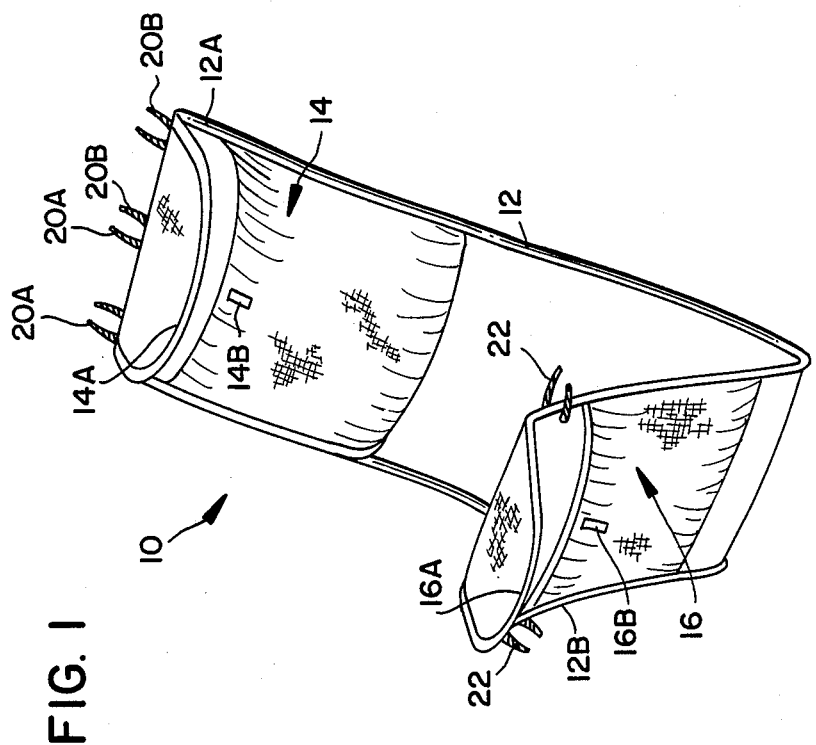
FIG. 1 is an isometric view of one embodiment of carrying device of the invention.
Figure 2:
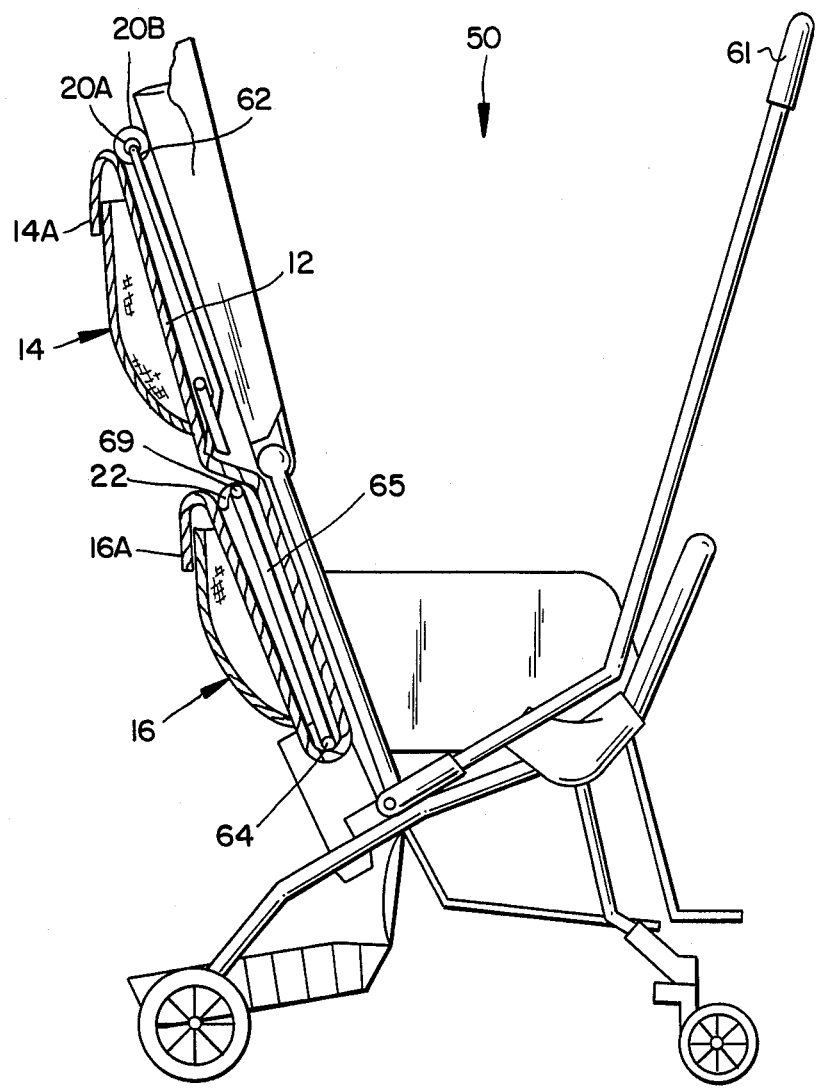
FIG. 2 is a side elevational, partially cutaway, view of one embodiment of carrying device attached to a conventional stroller.

In the drawings there is illustrated a preferred embodiment of carrying device 10 of the invention. The device comprises an elongated strip or sheet 12 which is flexible and conformable. Preferably there are at two pocket members 14 and 16 secured to opposite ends of sheet 12, as illustrated.

Pocket 14 is on the front face of the sheet 12 while pocket 16 is secured to the rear face of the sheet. Both pockets are accessible at the same time when the carrying device is attached to the backmember of a stroller 50.

The upper end 12A of the carrying device includes several fastening members to facilitate attachment of the device to an upper crossmember 62 of the backmember of the stroller. On some stroller models the crossmember 62 is actually covered by the fabric 40A of the stroller canopy 40, which accordingly must be unsnapped and temporarily pulled out of the way in order to attach strips 20A and 20B to crossmember 62, as illustrated. Each fastening member comprises strips 20A and 20B. One such strip includes the hook portion, and the other strip includes the loop portion, of a conventional hook and loop fastener system (e.g., such as is commercially available under the name Velcro). The strips 20A and 20B are wrapped around the upper crossmember in such a manner that the hook and loop portions are placed into contact with each other and thereby detachably secure the upper end of the carrying device to the upper crossmember in an adjustable manner.

The carrying device extends downwardly from the upper crossmember on the outside of the frame, then it passes through a full-width horizontal gap in the backmember just above center crossmember 69 and extends behind and below a lower crossmember 64. Then the carrying device extends upwardly against the outside of the frame. The second end 12B of the carrying device is detachably secured to the frame by means of strings or cords 22 which are generally tied around the center crossmember.

The carrying device is made of flexible material. Preferably it is made of fabric. Various types of fabric may be used. It could instead be composed of plastic, if if desired. One or more stiff horizontal stays 13 may be included in the carrying device to keep it from bunching up horizontally.

The pockets may be of any desired size. Preferably the fabric composing the front of the pockets is gathered or pleated in such a way that the pockets can expand to hold a large volume of contents. The front edge of each pocket preferably includes an elastic strip or band 15 to help hold the pocket in closed position.

Figure 9:
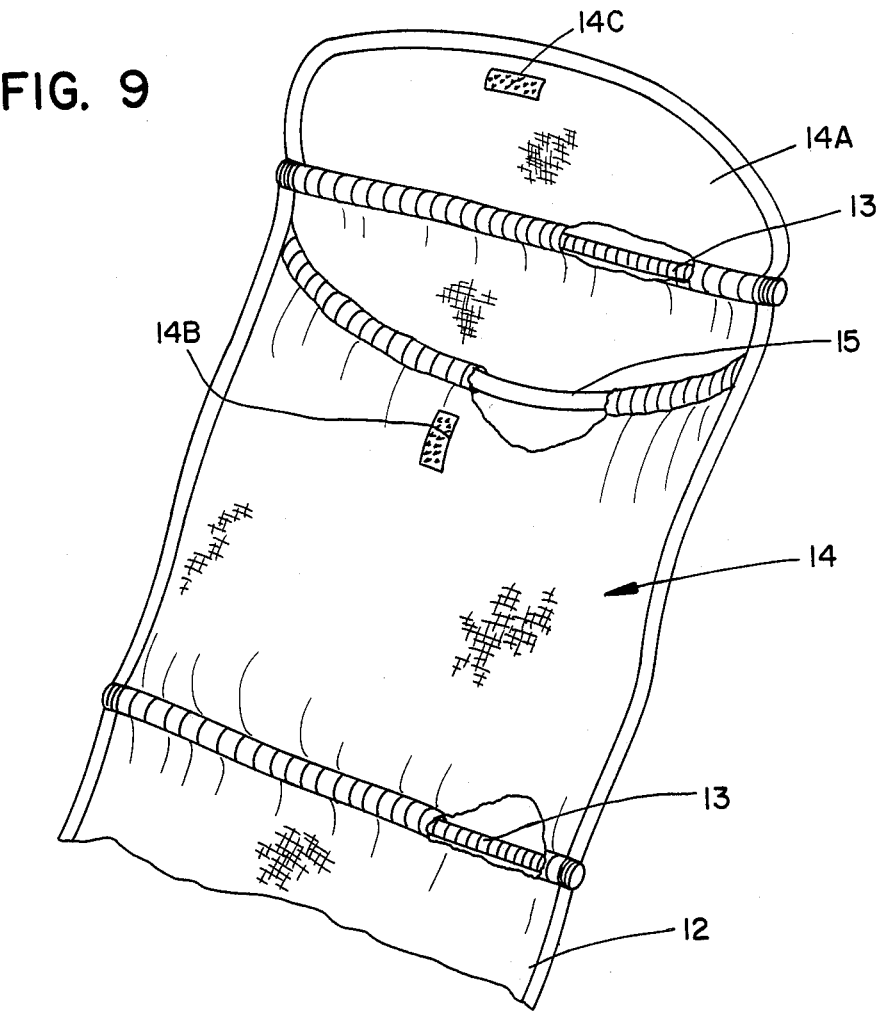
FIG. 9 is a fragmentary view, partially cut-away, of the embodiment shown in FIG. 1.

The pockets also preferably include a cover flap 14A and 16A, respectively. The flap may be temporarily retained in closed position by means of mating hook and loop fasteners. One such fastener 14B and 16B is shown respectively on pockets 14 and 16. The other mating portion (e.g. 14C as shown in FIG. 9) is secured to the underside of the cover flap.

Other closure means for temporarily securing the cover flap in closed position may also be used. For example, a snap, buckle, button, or conventional fastening means may be used if desired. Also, a zipper could be used to close the top of the pockets. As yet another alternative, the top edge of the pocket could include a resilient horizontal stay or tight elastic to hold the pocket in closed position.

Figure 5:
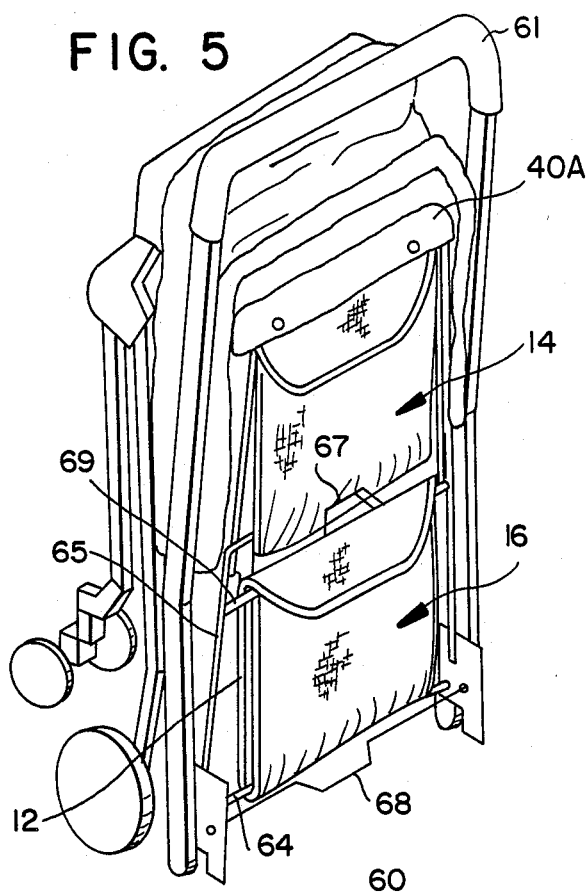
FIG. 5 is a rear isometric view of the stroller of FIG. 2 in folded condition.

The carrying device of this invention is detachably secured at each of its ends to the backmember of a stroller as illustrated in the drawings. The stroller can be reclined (as shown in FIG. 4) or collapsed to a folded condition (as shown in FIG. 5) without detaching or loosening the carrying device. Also, the carrying device does not in any way interfere with the normal use of the stroller, nor does it interfere with reclining or folding of the stroller.

Figure 6A:
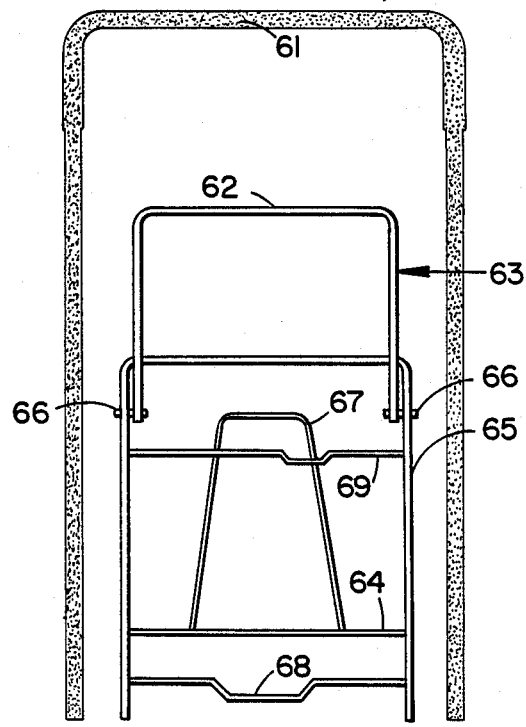
FIGS. 6A and 6B are rear elevational views illustrating two types of foldable stroller frames to which the carrying device of this invention may be attached.
Figure 6B:
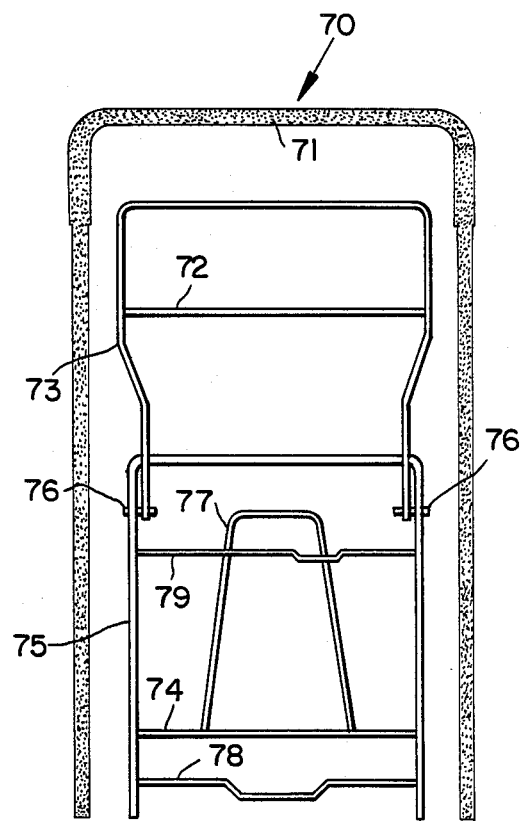

FIGS. 6A and 6B are rear elevational views illustrating two common types of folding stroller frames with which the carrying device of the invention is especially useful. The frame 60 shown in FIG. 6A includes stroller handle 61, upper crossmember 62 in upper frame loop 63 and lower crossmember 64 in lower frame loop 65. The upper frame loop 63 is hinged to lower frame loop 65 by means of pins 66. Recline handle 67 is attached at its lower end to crossmember 64, and recline support 69 is secured to frame loop 65. Fold pedal 68 is secured across the lower end of frame loop 65.

The upper end of the carrying device is detachably secured to crossmember 62. It then extends downwardly past the upper end of lower frame loop 65. Then the carrying device passes behind the recline handle 67, recline support 69, and lower crossmember 64. The lower end of the carrying device is then pulled upwardly and detachably secured to lower frame loop 65 (normally by tying it to crossmember or recline support 69 or to the frame near pivot pins 66 or 76 shown in FIGS. 6A and 6B, respectively).

The frame 70 shown in FIG. 6B includes stroller handle 71, upper crossmember 72 in upper frame loop 73 and lower crossmember 74 in lower frame loop 75. The upper frame loop 73 is hinged to lower frame loop 75 by means of pins 76. Recline handle 77 is attached at its lower end to crossmember 74, and recline support 79 is secured to frame loop 75. Fold pedal 78 is secured across the lower end of frame loop 75. The carrying device is attached to the stroller frame in the same manner as described in connection with FIG. 6A except that the upper end of the carrying device is attached to crossmember 72 and not to the top of upper frame loop 73.

The length and width of the carrying device may vary so long as it can be attached to the backmember of a stroller in the manner described herein. The current embodiment of the device has been designed to fit the widest range of current stroller models possible with its dimensions of 32 inches in length and 11 inches in width; however, other sizes may be needed in order to accommodate changes in stroller design (e.g., a width in the range of about 10 to 13 inches and a length in the range of about 30 to 34 inches).

Figure 7:
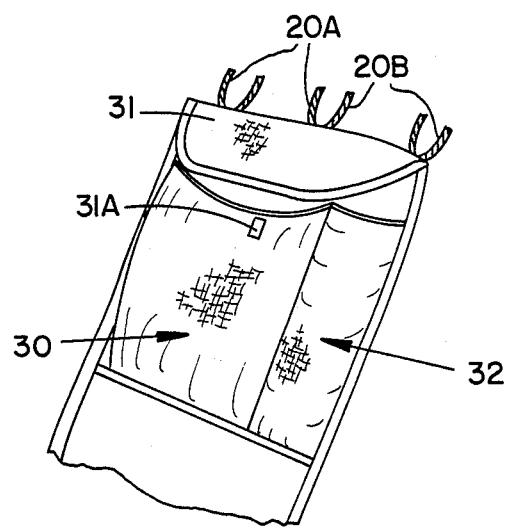
FIG. 7 is a fragmentary view of another embodiment of carrying device with multiple pockets on the upper end.

Other variants are also possible without departing from the scope of the present invention. For example, additional pockets could be included (e.g., to hold a bottle in an upright position), etc. For example, in FIG. 7 there is illustrated an embodiment of carrying device having pockets 30 and 32 on the upper end. Cover member 31 is adapted to fold over and close the top of the pockets. Closure means 31A on the outside of pocket 30 is adapted to hold cover 31 in closed position. Narrow vertical pocket 32 is especially useful for retaining a baby bottle, for example.

The upper and lower end of the carrying device may be detachably fastened to the backmember with fasteners of other types besides hook and loop fasteners and string or cord. For example, straps and buckles could be used.

Figure 8:
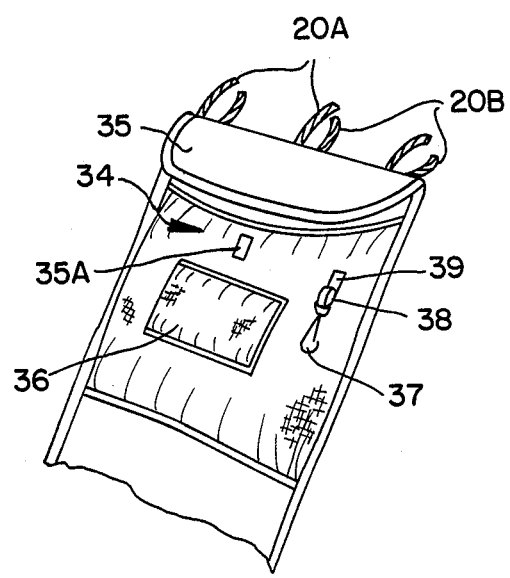
FIG. 8 is a fragmentary view of yet another embodiment of carrying device of the invention.

It is also possible to include various conventional attachment means to the outer surfaces of the pocket members or other portions of the device. For example, it is possible to secure items such as hooks, loops, snaps, buttons, rings, etc. to the device for holding miscellaneous items such as keys, toys, pacifiers, etc. This is illustrated in FIG. 8 where there is shown snap member 37 secured to the outside of pocket member 34 by means of loop 38 which is stitched at one end 39 to pocket 34. Cover member 35 is adapted to cover or close the top of pocket 34. Closure means 35A on pocket 34 is adapted to retain the cover 35 in closed position.

FIG. 8 also illustrates the provision of a secondary pocket 36 which is carried by pocket 34, as illustrated. Pocket 36 may include its own cover, if desired, or it may have an elastic top edge to keep it normally closed.

Alternatively, this pocket or any of the pockets may be sufficiently tight that items are held in it because of friction (i.e. because of a snug fit). The pockets could be provided in specific shapes to hold or accommodate specific items, if desired.

The size of the pockets may also vary, as desired. Also, the sheet member 12 does not have to be a continuous sheet from one end of the carrying device to the other end. For example, between the upper and lower pockets it is possible to use two straps instead of a continuous sheet.

If the carrying device is composed of fabric it is preferred that it be washable. Combinations of different materials may be also be used in the carrying device.

What is claimed is:

1. In combination with a foldable stroller of the type including a backmember having upper and lower crossmembers, a carrying device comprising:
   (a) a length of flexible sheet material having first and second ends;
   (b) first and second pocket members each having closure means for selectively closing said pocket members; wherein said first pocket member is secured to said first end of said sheet material and said second pocket member is secured to said second end of said sheet material;
   (c) first attachment means secured to said first end of said sheet material;
   (d) second attachment means secured to said second end of said sheet material;
wherein said first end of said sheet material is detachably secured to said upper crossmember; wherein said sheet material extends downwardly around said lower crossmember and then upwardly toward said upper crossmember; wherein said second end of said sheet material is detachably secured to said backmember between said upper and lower crossmembers; wherein said pocket members are accessible from the rear of said stroller; and wherein said stroller can be reclined or folded without detaching said carrying device.

2. A combination in accordance with claim 1, wherein said sheet material comprises fabric.

3. A combination in accordance with claim 1, wherein said first attachment means comprises strap members including hook and loop fasteners.

4. A combination in accordance with claim 1, wherein said second attachment means comprises string members.

5. A combination in accordance with claim 1, wherein said closure means on each said pocket member comprises a cover flap.

6. A combination in accordance with claim 1, further comprising at least one stay member horizontally disposed and attached to said sheet material.

7. A combination in accordance with claim 1, wherein each said pocket member includes a front edge, and wherein each said front edge is elastic.

8. A combination comprising:
   (a) a foldable stroller including a backmember having upper and lower crossmembers;
   (b) a carrying device comprising:
      (i) a length of flexible sheet material having first and second ends;
      (ii) at least one pocket member having closure means for selectively closing said pocket member; wherein said pocket member is secured to said first end of said sheet material;
      (iii) first attachment means secured to said first end of said sheet material;
      (iv) second attachment means secured to said second end of said sheet material;
wherein said first end of said sheet material is detachably secured to said upper crossmember; wherein said sheet material extends downwardly around aid lower crossmember and then upwardly toward said upper crossmember; wherein said second end of said sheet material is detachably secured to said backmember between said upper and lower crossmembers; wherein said pocket member is accessible from the rear of said stroller; and wherein said stroller can be folded without detaching said carrying device.

9. A combination in accordance with claim 8, wherein said sheet material comprises fabric.

10. A combination in accordance with claim 8, wherein said first attachment means comprises strap members including hook and loop fasteners.

11. A combination in accordance with claim 8, further comprising a second pocket member secured to said second end of said sheet material.

12. A combination in accordance with claim 11, wherein said closure means on each pocket member comprises a cover flap.

13. A combination in accordance with claim 8, further comprising at least one stay member horizontally disposed and attached to said sheet material.

14. A combination in accordance with claim 8, wherein said pocket member includes a front edge, and wherein said front edge is elastic.

* * * * *